United States Patent Office 2,791,594
Patented May 7, 1957

2,791,594

PROCESSES OF ENHANCING PHOSPHATIDES AND OTHER ORGANIC MATERIALS

Douglas J. Hennessy, Teaneck, N. J., and Raymond J. Moshy, New York, N. Y., assignors to American Lecithin Company, Inc., Woodside, N. Y., a corporation of Ohio No Drawing. Application February 11, 1952,
Serial No. 271,066

8 Claims. (Cl. 260—403)

The present invention relates to processes of enhancing phosphatides and other organic materials and the products thereof.

Although the present invention will be particularly described in its application to phosphatides, such as lecithin, it has a much broader application to the treatment and processing of organic materials in general and especially such organic materials that have double or unsaturated bonds and for oxygen functions which render them subject to destruction of charring when treated with strong chemical reagents.

It is among the particular objects of the present invention to develop a procedure of enhancing organic compounds, such as phosphatides or lecithin, which will enable great increase in their miscibility in various solvents and particularly aqueous compositions or water and at the same time substantially preserve and retain the organic complex or molecular structure without substantial destruction, charring or breaking down into simpler or less complex molecular structures or polymerization into tarry or gummy more complex structures.

Lecithin either in substantially oil-free form or in its commercial composition in which there is a mixture of about 67% of lecithin and 33% of soya bean oil cannot be widely utilized because it is difficult to disperse it or dissolve it in water or aqueous media.

Lecithin or phosphatides normally will not readily mix in other fluids and there is considerable difficulty in obtaining dispersions thereof, and because of its resistance to miscibility with water or aqueous liquids, the possibilities of its usefulness in lubricating or grinding oils, in the preparation of aqueous dispersions and stable emulsions and in the treatment of textile or in processes of pigment wetting are quite limited.

Vegetable lecithin or natural phosphatides normally are very complex mixtures, particularly when derived from soya beans or even corn, and said mixtures are composed of the phosphatide lecithin, some fat usually in the form of soya bean or other glyceride oil, lipositol, cephalin carbohydrate and the like.

Wherever lecithin is referred to hereinafter, it will be understood to include also other phosphatides, similar mixtures or related organic compositions having chemical structural features similar to those present in lecithin.

It has not been found readily possible to treat this mixture to enhance its solubility or water miscibility because of the reactivity of the lecithin and related components and because of its tendency to degrade or break-down or polymerize into undesirable products and particularly because of excessive charring.

It is among the objects of the present invention to provide a treatment for lecithin or similar organic materials either in crude or oil-free conditions in which the miscibility and other dispersibility of the lecithin is greatly increased without substantial degradation, charring or breaking down or polymerization and without excessive splitting or destruction at the double bonds or other unsaturated linkages therein.

Another object of the present invention is to provide an improved, solubilized lecithin or similar organic materials retaining in substantially full strength its oily and lubricating properties and its surface contact effect, while at the same time being substantially miscible with water to provide emulsions of great stability and aqueous dispersions of enhanced value without the necessity of utilizing expensive synthetic emulsifying agents.

Another object is to convert commercial or crude lecithin without substantial loss in its phosphatide properties into a composition which is readily miscible in water or aqueous media.

A further object is to prepare a modified lecithin which will be effective as a detergent in lubricating oils which will enhance lubricity and positive effect in grinding oils, which will facilitate the preparation of aqueous dispersions and emulsions of great stability, and which may be employed for treating textiles and greatly to increase the speed of pigment wetting by solvents or oils.

A still further object of the present invention is to provide an acylated lecithin or phosphatide or a hydroxylated or epoxylated lecithin or phosphatide which will be largely or substantially free of charred by-products, which will be highly dispersible in aqueous or organic liquids and which has particular utility as an additive in lubricating oils and in gasoline or diesel fuels and for use in fat liquoring used by leather tanners.

Still another object is to provide a modified lecithin or phosphatide which will partly serve as a detergent in aqueous fluids as well as in oils, as an agent to increase the sweat point of hard vegetable butters and as an emulsifying and stabilizing agent which when added to aqueous fluids will resist acid precipitation.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most suitable, according to one embodiment of the present invention, to treat the lecithin composition, and preferably an oil-free lecithin, with oxidizing agents which will have a weak or limited oxidizing action thereon.

Among the preferred oxidizing agents of this character are various percompounds. Although many types of per-compounds may be utilized, such as peracetic acid or perpropionic acid or even hydrogen peroxide, in general various types of percompounds of organic or inorganic nature may be employed under such temperature, pH, and concentration conditions, as to give a limited chemical reaction upon the active bonds of lecithin or other similar organic compositions.

Although this pertreatment or weak oxidizing treatment in itself and by itself gives unusual satisfactory results, it has been found that even more active enhancement of lecithin or other organic compositions may be obtained with a combined treatment with an agent capable of introducing acid groups into the complex molecule of the lecithin.

Although weak acids may be employed in certain instances, it has been found most satisfactory to employ relatively strong inorganic acids which have been so treated or in such combinations or in the presence of such reagents that they will not exert too strong an effect upon the complex molecule and will not tend to char or cause disintegration of the complex molecule.

The preferred compounds of this character are phosphating or sulfating agents, in which the phosphoric acid or sulfuric acid is used in the presence of or in complexes formed with organic solvents, which will greatly reduce the drastic action which strong phosphating or sulfating compositions would have.

For example, very strong agents such as sulfur trioxide or phosphorous pentoxide or fuming sulfuric acid or oleum may be employed in the presence of organic solvents or liquids which will reduce their activity and enable most effective action upon the organic composition such as lecithin.

Among the preferred organic solvents are those which form complexes with the sulfur trioxide and phosphorous pentoxide, such as chlorinated hydrocarbons, particularly ethylene dichloride and oxygenated ring compounds such as, dioxane and also polyethers having two or more ether linkages. Less preferably, saturated or unsaturated hydrocarbon solvents may be employed.

The sulfation, sulfonation or phosphorylation may take place without the previous weak oxidizing or per-treatment, but in the preferred procedure according to the present invention, the oxidizing treatment is followed by the introduction of acid groups.

As an alternative both operations may take place simultaneously or in the same reaction mixture, or the oxidizing treatment may follow the introduction of acid groups.

Desirably, much less than 50% of the double bonds or unsaturated linkages are combined with an acid group, and preferably from 2% to 25% are so combined with the —$SO_4$ or —$OSO_3H$ group. In the preferred procedure about 15 to 20% of the double bonds are sulfated, phosphated or sulfonated.

Desirably, the sulfating or sulfonation or phosphorylation takes place in the absence of water and in the presence of organic liquid or solvent.

Among the preferred organic solvents are ethylene dichloride, methylene dichloride, propylene dichloride, tetrachloride, dioxane, dichlorethyl ether, ethylene glycol diethyl ether, dimethoxytetraglycol, dichlorethyl formal, dichlorisopropyl ether, triglycol dichloride and ethylene glycol diethyl ether and acetic acid.

In a preferred form of the invention, an ethylene dichloride-sulfur trioxide complex is added after treatment of a solution of lecithin dissolved in a composition of glacial acetic acid with a per acid, preferably peracetic acid.

The lecithin is desirably used in the form of a liquid containing 1% to 2% of free fatty acid and about 30% to 35% of soya bean oil.

Example 1

To prepare a sulfonated lecithin, 100 parts of liquid commercial lecithin is reacted with 5 parts of 40% peracetic acid.

To this reaction mixture there is added with good mixing an ethylene chloride-sulfur trioxide complex which contains about 5 parts of sulfur trioxide in each 10 to 12 parts of ethylene dichloride, all parts being by weight.

This ethylene dichloride-sulfur trioxide compound is produced by adding sulfur trioxide in liquid or polymerized form in small quantities to the ethylene dichloride which is chilled with thorough stirring.

After the ethylene dichloride and sulfur trioxide has completed its action upon the lecithin, the mixture is neutralized with an organic or inorganic base.

During this treatment the temperature should be kept below 45° C. and after all of the ethylene dichloride-sulfur trioxide has been added, the reaction mixture may be allowed to come to room temperature with external cooling.

Example 2

A solution of 88 grams of dry dioxane in 250 to 300 ml. ethylene chloride is cooled to 4° to 8° C. in an ice bath.

To this is added, with stirring, 80 grams of sulfur trioxide. The sulfur trioxide is added at such a rate that the reaction temperature does not exceed 20° C. After the addition has been completed, the mixture is cooled and the white, crystalline dioxane-sulfur trioxide complex is separated from the supernatant liquid and left suspended as a slurry in the residual liquid.

40 grams of 40% peracetic acid dissolved in glacial acetic is added to 1 kilogram of liquid lecithin, either a 67%–33% soya oil mixture, with efficient mixing. The addition is at such a rate that the temperature is always kept below 45° to 50° C. This usually requires about one-half hour. The lecithin is now lemon yellow and somewhat more fluid. The mixture is stirred for at least one-half hour more or allowed to stand for an hour.

100 grams of solid or slurry of dioxane-sulfur trioxide is added in 25 gram portions over a period of 1 to 1½ hours while mixing. The reaction temperature is maintained below 50° C.

There is a darkening of the lecithin where the solid first touches but the discoloration rapidly disappears. After the addition is complete the mixture is a gold or honey colored mass.

On cooling the mixture becomes quite viscous—more so than the original lecithin.

The neutralization is carried out as soon as possible and desirably within 2 hours after completion of the sulfonation to prevent darkening. The mixture is neutralized with 60% KOH added at such a rate that the temperature does not exceed 45° to 50° C. Local excess of base is to be avoided so as to minimize saponification of the glyceride and to prevent darkening. The base is added until a pH of 6.5 to 7 is reached when a 5% dispersion of the product is made in water.

The product produced is a fluid clear, honey colored and water dispersible composition having the general appearance, bulk and plasticity of lecithin, and yet is readily dispersible in water and acts as a particularly effective detergent in lubricating oils. In itself it will act to give emulsions and aqueous dispersion of great stability and it may be used for finishing or otherwise treating textiles and to increase the speed of pigment wetting or wetting of carbon black by solvents of oils.

Example 3

4% by weight of 40% peracetic acid is added, with vigorous mixing, to liquid lecithin. The temperature is maintained between 35° C. to 55° C.

To this mixture 10% by weight of crystalline dioxane-sulfur trioxide, or 10% by weight of dioxane-sulfur trioxide as a slurry in a suitable solvent, e. g. ethylene chloride, is added in portions with vigorous mixing. Temperature is maintained between 25° and 50° C.

The mixture is neutralized with 60% potassium hydroxide to pH 6.5–7. The pH is measured on a 5% dispersion of the material in water at 25°. Water and solvent may be removed by vacuum drying if desired.

Among the various alkalies which may be employed for neutralization are powdered anhydrous potassium or sodium hydroxide, 50% sodium or potassium hydroxide solution, powdered hydrated or anhydrous barium hydroxide, a 60% slurry of barium hydroxide, concentrated or 28% ammonium hydroxide, anhydrous ammonia gas under pressure, organic amines such as, triethanolamine, triethylamine or dicyclohexyl amine.

In general, in Examples 1 to 3, neutralization may be carried out by use of a suitable inorganic or organic base either with or without water as a solvent for the base. This neutralization will also be a final step in each of the following examples:

Example 4

4% by weight of 40% peracetic acid is added with vigorous mixing to liquid lecithin. Temperature is kept between 35° C and 55° C.

To this mixture is added 5% by weight of dioxane-sulfur trioxide either in a dry crystalline form or as a slurry in a suitable solvent, such as ethylene chloride, with vigorous stirring. Temperature is maintained between 35° C. and 55° C.

Neutralization to pH 6.5–7 is effected with a suitable inorganic or organic base.

The same procedure may be employed using 20%, 30% and 35% of dioxane-sulfur trioxide with temperatures ranging from 20° to 35° C.

*Example 5*

8% by weight of 40% peracetic acid is added with vigorous mixing to liquid lecithin. Temperature is maintained between 35° C. and 55° C.

To this mixture is added 5% by weight of dioxane-sulfur trioxide either in dry crystalline form or as a slurry in a suitable solvent, such as ethylene chloride, with vigorous mixing. Temperature is maintained between 35° C. and 55° C.

Neutralization to pH 6.5–7 is effected with a suitable inorganic or organic base.

Similarly instead of using 5% of dioxane sulfur trioxide it is possible to use 10%, 20%, 30% or 35%, preferably with a lower temperature as the percentage increases, ranging down to 20° C.

In general, the amount of peracetic acid may be varied from 2% to 15% by weight and the dioxane sulfur trioxide may be varied from 5% to 35% by weight.

*Example 6*

To employ a reverse sulfonation procedure, 10% by weight of ethylene dichloride-sulfur trioxide or of dioxane-sulfur trioxide is added to liquid lecithin with vigorous stirring. Temperature is kept between 25° C. and 40° C. One hour after the addition 4% by weight of 40% peracetic acid is added with vigorous mixing. Temperature is kept between 35° C. and 45° C.

Neutralization is effected with a suitable organic or inorganic base.

Instead of employing 10% of sulfonating agent, it is also possible to employ 20% or 30% with a lower temperature of between 15° C. and 25° C.

*Example 7*

2½% by weight of 40% hydrogen peroxide is added dropwise to liquid lecithin with vigorous mixing. To this mixture is added 10% by weight of dioxane-sulfur trioxide with vigorous mixing. Temperature is kept between 20° C. and 30° C. Neutralization is effected with a suitable inorganic or organic base.

*Example 8*

10% by weight of dioxane-sulfur trioxide was added to liquid lecithin with vigorous mixing. Temperature kept between 25° C. and 40° C.

To this was added 2½% by weight of 40% hydrogen peroxide dissolved in 60% potassium hydroxide. The pH is then adjusted to pH 7.

*Example 9*

10% by weight of dioxane-sulfur trioxide is added to liquid lecithin with vigorous mixing. Temperature is kept between 20° C. and 30° C. The product is neutralized with a suitable organic or inorganic base.

With 20% to 30% of dioxane-sulfur trioxide the temperature is kept between 15° C. and 20° C.

In the above examples where dioxane-sulfur trioxide is employed it may be replaced with ethylene dichloride-sulfur trioxide or mixtures may be utilized.

Referring to the above procedures, the preferred method employed to sulfonate lecithin was to add 10% ethylene dichloride-sulfur trioxide or crystalline dioxane-sulfur trioxide to liquid lecithin, which had been first treated with 4% by weight of 40% peracetic acid. The product was then neutralized with a concentrated solution of sodium hydroxide, potassium hydroxide or some liquid organic amine.

*Example 10*

Lecithin was treated with the sulfonating agent without the prior use of peracetic acid. In this example 10% by weight of dioxane-sulfur trioxide was added to liquid lecithin. The reaction mixture temperature rose slightly (40°–45° C.) but not nearly as much as when the peracid is used first (60° C.). The product (brown-black color) was neutralized to pH 7 and with potassium hydroxide. The color of the mixture became brown on neutralization. The product was not fluid but rather like a heavy light-colored grease and is not as useful as the products first treated with the per-compounds.

*Example 11*

Lecithin was also sulfonated with 5% peracetic acid and 5%, 10%, 20%, 30% and 35% dioxane-sulfur trioxide and then neutralized with potassium hydroxide to ph 6.5–7.

The reaction products all darkened, especially the 30% and 35% batches.

Upon neutralization, however, they all lightened up considerably except the 35% dioxane-sulfur trioxide batch.

The preferred upper limits therefore would seem to be 35% dioxane-sulfur trioxide with 4% peracetic acid.

*Example 12*

Lecithin was sulfonated with 8% peracetic acid and 5%, 10%, 20%, 30% and 35% dioxane-sulfur trioxide. The results were about the same as in Example 11. Again, on neutralization the products became considerably lighter. The upper limit appears to be 35% dioxane-sulfur trioxide. To obtain a lighter product using 30% or more dioxane-sulfur trioxide, the reaction mixture, after the sulfonation step, may be treated with a very small amount (about 0.1%) of peracetic acid or 0.05% of 40% $H_2O_2$.

The upper limits of peracetic acid would appear to be from 2% to 15%.

*Example 13*

Without a preliminary per-treatment, 10%, 20% and 30% dioxane-sulfur trioxide by weight were added to liquid lecithin. The sulfonation products varied from a light brown (10% dioxane-sulfur trioxide) to dark brown (20% dioxane-sulfur trioxide). All turned very dark if allowed to stand overnight.

After sulfonation for one hour, 4% peracetic acid was added to each batch. The 10% dioxane-sulfur trioxide batch lightened up to a pale brown while the 20% and 30% batches became darker. The upper limit seems to be 30% dioxane-sulfur trioxide where the per-treatment follows the sulfonation. Neutralization is effected by concentrated potassium hydroxide.

*Example 14*

Lecithin was sulfonated, using hydrogen peroxide in place of peracetic acid.

2½% to 40% $H_2O_2$ (equivalent to 4% of 40% peracetic acid) was added to liquid lecithin dropwise with vigorous mixing. The mixture became more and more viscous and finally solidified. It resembled lecithin soap in consistency and texture. To this mixture 10% dioxane-sulfur trioxide was added. The product was light-colored and quite liquid. Neutralized with concentrated potassium hydroxide. As the pH rose, the vicosity increased, until at pH 7 the product was again semi-solid.

*Example 15*

10% dioxane-sulfur trioxide was added to liquid lecithin, the mixture was treated with 2½% of 40% $H_2O_2$ dissolved in 60% KOH. The pH was adjusted to pH 7. Products of Examples 14 and 15 seem almost identical.

There was no heat of reaction noticeable when $H_2O_2$ was added in Example 14. Heat reaction with peracetic acid was quite evident.

To summarize, 35% dioxane-sulfur trioxide is the upper limit when the per-treatment is first accomplished. In reverse addition 30% dioxane-sulfur trioxide is the upper limit. The amount of peracetic acid may be widely varied.

Hydrogen peroxide or perpropionic acid may readily be used instead of peracetic acid.

Neutralization may be effected in all cases with concentrated solutions of alkali or with powdered alkali or with organic amines.

In the phosphorylation of lecithin, the phosphorous pentoxide may be used directly after per-treatment of the lecithin or it may be combined first with ethylene dichloride or dioxane or a polyether and then utilized as a phosphorylation agent.

Example 16

7½ parts by weight of phosphorous pentoxide is combined with 5 parts by weight of dioxane and 25 parts by weight of ethylene chloride. A flocculent solid is formed.

The slurry of this flocculent solid is added to 100 parts by weight of liquid lecithin which at first had been treated with 4 parts by weight of 40% peracetic acid.

Some heat was evolved but the temperature was maintained below 60° C. The neutralization was effected by 60% potassium hydroxide solution and the pH was adjusted to 7.

The products are golden brown and water dispersible.

The product may be dried in an oven overnight at 50°–60° C. with slight darkening.

Example 17

Phosphorous pentoxide may be applied directly to the per-treated lecithin by adding 2½ parts by weight of phosphorous pentoxide to 50 parts by weight of lecithin which has been treated with 2% or 4% of 40% peracetic acid.

The products are neutralized with potassium hydroxide to pH 7.

Instead of 2½ parts of phosphorous pentoxide, it is also possible to use 5, 7½, 10, and 12½ parts of phosphorous pentoxide.

The products generally were viscous, golden brown to light brown and possessed agreeable odors and were water dispersible.

The preliminary per-treatment may be omitted but the compositions produced are less water dispersible and are darker in color and have a less agreeable odor, after neutralization with sodium or potassium hydroxide.

Generally a per-treatment with 2% or 4% of peracetic acid should precede the treatment of the lecithin with 5% to 25% of phosphorous pentoxide by itself or 5% to 25% of the composition of phosporus pentoxide and an organic solvent, such as, ethylene chloride, dioxane or polyethers.

In the above procedures other sulfating or phosphorylating agents may be employed, such as halogenated compounds, and other peracids or even inorganic persalts may also be employed.

A minor proportion of the double bonds in the lecithin are combined and excessive dehydration of the lecithin is avoided. Desirably, to remove the excess solvent from the modified lecithin, a vacuum may be employed.

The final product is probably a hydroxylate, an epoxylate and sulfate of the original lecithin material, with increased intensity and prolongation of the process, resulting in more of the sulfate and less of the hydroxylate.

Based upon an assumption that there are 1½ double bonds per molecule of the lecithin, the above process will result in hydroxylation and epoxylation of about ¼ to ⅓ of these double bonds, although this may range from $\frac{1}{10}$ to ½ of the double bonds. Preferably, about 5% to 10% of the double bonds are converted into hydroxylated, epoxylated or sulfated compounds. If desired, the lecithin before treatment may be subjected to a high pressure processing with ethylene oxide in the presence of such catalysts as sodium methylate or potassium ethylate.

This may be followed by the above sulfation or phosphorylation treatment.

Instead of lecithin it is possible to treat crude, vegetable, animal and marine oils, tank bottoms or vegetable oil residues, unsaturated fatty oils, and lipoids, similar to lecithin.

Organic peracids, such as, peracetic acid are preferred to perchlorides, permanganates and perborates.

Chlorinated, halogenated or oxygenated solvents are preferred to straight hydrocarbons such as benzene or petroleum ether.

Straight hydrocarbons however, may be utilized, such as petroleum fractions, where the composition is to be added finally to gasolene or lubricating oil to improve their stability, since this will avoid the necessity of eliminating the solvent after the per-treatment and sulfonating treatment.

The modified lecithin produced as above may be used in lubricating oils as a detergent and also to enhance the film strength to various oils.

The product emulsifies more readily with water and the water emulsion is not as readily precipitated in the presence of an acid.

The addition of a small percentage of the above modified lecithin tends to increase the sweat point of hard vegetable butter as contrasted to ordinary lecithin, which lowers said sweat point. The lecithin may also be utilized in fat liquors employed in the tanning of leather.

The enhanced lecithin has greatly increased stabilizing effect and has better oily properties and is more readily miscible both in oil and water compositions or emulsions.

The phosphorylated lecithin may be readily added to bakery products to improve the blending and to favorably influence the quality of the finished products.

The sulfonated or phosphorylated lecithin may be filtered with or without the presence of the solvent to remove insolubles.

Where the pH of the final product is determined, it is determined by testing an aqueous dispersion of the processed lecithin.

In some instances, part or all the sulfur or phosphorous oxides may be replaced by oxychlorides of sulfur or phosphorous and less preferably by sulfur or phosphorous chlorides. It is also possible to use phosphorous sulfide.

Less preferable for non-edible purposes are oxides, chlorides, sulfides, phosphides and oxysulfides of arsenic, antimony and bismuth.

As many changes could be made in the above lecithin compositions and processes of producing the same, and many widely different embodiments of this invention could be made without departing from the scope of the claims, it is intended that all matter contained in the above description shall be interpreted as illustrative and not in a limited sense.

Having now particularly described and ascertained the nature of the invention, and in what manner the same is to be performed, what is claimed is:

1. A process of modifying lecithin which comprises treating lecithin first with per-acetic acid and then with a dioxane-sulfur trioxide complex at a temperature of 25° to 50° C.

2. A process of producing a novel phosphatide which comprises treating such phosphatide first with a peracetylating agent followed by treatment with a sulfonating agent, said peracetylating agent being selected from the group consisting of peracetic acid, perpropionic acid and hydrogen peroxide and said sulfonating agent being selected from the group consisting of ethylene chloride-sulfur trioxide complex, an ethylene dichloride-sulfur trioxide complex and a dioxane-sulfur trioxide complex.

3. A process of producing a novel phosphatide product which comprises treating a phosphatide first with a low molecular weight per-fatty acid and following this treatment with a sulfonating agent, said per-fatty acid being selected from the group consisting of peracetic and perpropionic acid and said sulfonating agent being selected from the group consisting of an ethylene chloride-sulfur trioxide complex, an ethylene dichloride-sulfur trioxide complex and a dioxane-sulfur trioxide complex.

4. A process of modifying lecithin which comprises treating the lecithin with 40% peracetic acid at a temperature of 35° to 55° C. and then following this treatment by a treatment with a sulfonating agent selected from the group consisting of ethylene-chloride-sulfur-trioxide complex and dioxane-sulfur trioxide complex.

5. A process of modifying lecithin which comprises treating lecithin first with peracetic acid and then with sulfur trioxide complex selected from the group consisting of an ethylene-chloride-sulfur-trioxide complex and a dioxane-sulfur trioxide complex.

6. A process of modifying lecithin which comprises treating lecithin first with peracetic acid at a temperature of 35° to 55° C. and then treating it with dioxane-sulfur trioxide complex at a temperature of between 25° and 50° C.

7. A process of producing a novel lecithin which comprises treating such lecithin first with a peracetylating agent selected from the group consisting of peracetic acid and perpropionic acid followed by treatment with a sulfonating agent selected from the group consisting of complexes of sulfur trioxide with dioxane, ethylene chloride and ethylene dichloride.

8. A process of producing a novel phosphatide product which comprises treating a phosphatide first with a low molecular weight per-fatty acid selected from the group consisting of peracetic acid and perpropionic acid and following this treatment with a sulfonating agent selected from the group consisting of complexes of sulfur trioxide with dioxane, ethylene chloride and ethylene dichloride.

References Cited in the file of this patent

UNITED STATES PATENTS

| 1,892,588 | Schwieger | Dec. 27, 1932 |
| 2,073,011 | Hubbuch | Mar. 9, 1937 |
| 2,079,973 | Strauch | May 11, 1937 |
| 2,086,217 | De Groote | July 6, 1937 |
| 2,272,616 | Thurman | Feb. 10, 1942 |
| 2,299,743 | Epstein | Oct. 27, 1942 |
| 2,371,476 | Sifferd | Mar. 13, 1945 |
| 2,445,948 | Wittcoff | July 27, 1948 |
| 2,629,662 | Julian et al. | Feb. 24, 1953 |

FOREIGN PATENTS

| 518,194 | Great Britain | Feb. 20, 1940 |

OTHER REFERENCES

"Unit Processes in Org. Synthesis" (Groggins), 3rd edition, published by McGraw-Hill Book Company, Inc., New York (1947). (Page 262 relied upon.)